US008967583B2

(12) United States Patent
Stoia

(10) Patent No.: US 8,967,583 B2
(45) Date of Patent: Mar. 3, 2015

(54) MANUALLY LONGITUDINALLY ADJUSTABLE MOTOR VEHICLE SEAT

(75) Inventor: Dan Stoia, Stadthagen (DE)

(73) Assignee: Faurecia Autositze GmbH, Stadthagen (DE)

( * ) Notice: Subject to any disclaimer, the term of this patent is extended or adjusted under 35 U.S.C. 154(b) by 503 days.

(21) Appl. No.: 13/296,172

(22) Filed: Nov. 14, 2011

(65) Prior Publication Data

US 2012/0119051 A1 May 17, 2012

(30) Foreign Application Priority Data

Nov. 13, 2010 (DE) .......................... 10 2010 051 337

(51) Int. Cl.
*F16M 13/00* (2006.01)
*B60N 2/07* (2006.01)
*B60N 2/08* (2006.01)
*B60N 2/12* (2006.01)

(52) U.S. Cl.
CPC ............ *B60N 2/0705* (2013.01); *B60N 2/0818* (2013.01); *B60N 2/0887* (2013.01); *B60N 2/12* (2013.01)
USPC ........ 248/429; 248/430; 248/424; 297/344.1; 296/65.13

(58) Field of Classification Search
USPC .............. 248/429, 430, 424, 503.1, 341, 340, 248/344.11; 296/65.09, 65.13, 65.14; 297/344.1, 341, 340, 344.11
See application file for complete search history.

(56) References Cited

U.S. PATENT DOCUMENTS

| 5,820,216 | A | * | 10/1998 | Feuillet | 297/341 |
| 6,352,310 | B1 | * | 3/2002 | Schmidt et al. | 297/378.12 |
| 6,431,631 | B1 | * | 8/2002 | Hofmann et al. | 296/65.03 |
| 6,616,233 | B1 | * | 9/2003 | Debus et al. | 297/341 |
| 6,619,741 | B1 | * | 9/2003 | Tame | 297/341 |
| 6,799,801 | B2 | * | 10/2004 | Niimi et al. | 297/378.12 |
| 6,830,296 | B2 | * | 12/2004 | Kojima | 297/341 |
| 7,172,249 | B2 | * | 2/2007 | Rausch et al. | 297/341 |
| 7,350,867 | B2 | * | 4/2008 | Park | 297/378.12 |
| 7,523,913 | B2 | * | 4/2009 | Mizuno et al. | 248/429 |
| 7,562,926 | B2 | * | 7/2009 | Kojima | 296/65.13 |
| 7,588,293 | B2 | * | 9/2009 | Kojima | 297/344.1 |

(Continued)

FOREIGN PATENT DOCUMENTS

| DE | 10339056 | 3/2004 |
| FR | 2 865 974 | 8/2005 |

*Primary Examiner* — Terrell McKinnon
*Assistant Examiner* — Monica Millner
(74) *Attorney, Agent, or Firm* — Jennifer S. Stachniak; Robert W. Becker

(57) ABSTRACT

A manually, longitudinally adjustable motor vehicle seat having a lower rail secured to a vehicle chassis, and an upper rail longitudinally displaceable in the lower rail and secured to a seat component. Locking mechanisms released by release mechanisms secure the rails, and assume a release position when the backrest is folded forward. A blocking lever pivotably mounted on a pivot shaft secured to the upper rail can assume two stable extreme pivot positions, namely a passive position where the blocking lever has no contact with the release mechanism, and an active position where the blocking lever blocks the release mechanism in its release position. Upon longitudinal displacement of the seat from a comfort-longitudinal adjustment arrange into an easy-entry-longitudinal adjustment range, a control device comes into contact with the blocking device pivoting against the force of a spring device, out of its passive and into its active position, and vice versa.

4 Claims, 10 Drawing Sheets

(56) References Cited

U.S. PATENT DOCUMENTS

| | | | |
|---|---|---|---|
| 7,600,802 B2 * | 10/2009 | Kojima | 296/65.13 |
| 7,918,507 B2 * | 4/2011 | Schmale | 297/341 |
| 7,971,920 B2 * | 7/2011 | Jang et al. | 296/65.13 |
| 8,049,491 B2 * | 11/2011 | Nishide | 324/207.24 |
| 8,292,366 B2 * | 10/2012 | Ma | 297/341 |
| 8,449,033 B2 * | 5/2013 | Shao et al. | 297/341 |
| 8,573,698 B2 * | 11/2013 | Wojatzki et al. | 297/344.1 |
| 2004/0051361 A1 * | 3/2004 | Rausch et al. | 297/341 |
| 2004/0075324 A1 * | 4/2004 | Rausch et al. | 297/341 |
| 2004/0131291 A1 * | 7/2004 | Niimi et al. | 384/47 |
| 2004/0232750 A1 * | 11/2004 | Rohee et al. | 297/334 |
| 2007/0176072 A1 * | 8/2007 | Ikegaya et al. | 248/429 |
| 2008/0084085 A1 * | 4/2008 | Mizuno et al. | 296/65.13 |
| 2009/0058169 A1 * | 3/2009 | Soga | 297/463.1 |
| 2009/0322136 A1 * | 12/2009 | Kazyak et al. | 297/344.1 |

* cited by examiner

MANUALLY LONGITUDINALLY ADJUSTABLE MOTOR VEHICLE SEAT

The instant application should be granted the priority date of Nov. 13, 2010 the filing date of the corresponding German patent application 10 2010 051 336.9.

BACKGROUND OF THE INVENTION

The present invention relates to a manually, longitudinally adjustable motor vehicle seat.

A motor vehicle seat is known from FR 2 865 974 B1. On each of its sides oriented in the longitudinal direction of the vehicle, this known seat has a rail pair, comprised of a lower rail and an upper rail, with the upper rail being longitudinally displaceably mounted in the lower rail, and being capable of being fixed in position, by locking means, in various longitudinal positions on the lower rail to provide an occupant a comfortable seating on the vehicle seat that is adapted to his or her anatomical characteristics. The lower rail is fixedly connected to the chassis of the vehicle, and the upper rail is connected to a component of the vehicle seat.

In addition to the above-described comfort-longitudinal adjustment of the seat, this known seat has a so-called easy-entry function, which is used in particular in 2-door vehicles to make getting into and out of rear seats of the vehicle easier for passengers. This function allows the vehicle seat, when the backrest is folded forward, to be shifted toward the front into an easy-entry-longitudinal adjustment range beyond its comfort-longitudinal adjustment range.

To be able to lock the upper rails in position on the lower rails, in the comfort-longitudinal adjustment range the lower rails are provided on both sides with a plurality of spaced-apart arresting notches that are open toward the bottom. Depending upon the adjusted longitudinal position of the seat, in the locking position latching teeth of a locking plate that is part of the locking mechanism engage in one of these arresting notches, whereby the locking plate is pre-tensioned in the locking position and can be pressed downwardly by means secured to the upper rail against the pre-tensioning for the release, so that the latching teeth exit downwardly out of the arresting notches. Such a locking mechanism is known in the state of the art, and is also described in principle in FR 2 865 974 E1.

Motor vehicle seats of the type described have the requirement that in the easy-entry-longitudinal adjustment range, the upper rails remain released from the lower rails, even if in the easy-entry-longitudinal adjustment range the backrest is folded back into its position of use. This problem is resolved by the prior art in that the lower rails have no arresting notches in the easy-entry-longitudinal adjustment range. The drawback of this is that for motor vehicles seats having different lengths of comfort-longitudinal adjustment ranges, correspondingly different lower rails have be manufactured.

If the easy-entry-longitudinal adjustment ranges are very long, it is possible for the walking plate to come entirely out of the lower rails. If in this case the vehicle seat is in the easy-entry-longitudinal adjustment range, and the backrest is folded back into its position of use, the locking plate assumes its locking position externally of the lower rail, with the consequence that when the vehicle seat is pushed back into the comfort-longitudinal adjustment range, the locking plate runs against the end face of the lower rail, which can lead to failure or destruction of the locking mechanism.

A further motor vehicle seat of the aforementioned general type is known from DE 103 39 056 A1. This vehicle seat has a first lever, which is pivotably hinged to the upper rail and is connected with the backrest via a Bowden cable. When the backrest is folded forward into the easy-entry-position, the first lever is pivoted by the Bowden cable into a release position, in which locking means between the lower rail and the upper rail are released. The vehicle seat has a second cable, which is also pivotably mounted on the upper rail. This second lever is pre-tensioned on the first lever, and has a first lever arm and a second lever arm. When the first lever is in the release position, the first lever arm of the second lever engages behind a recess of the first lever and, due to the pre-tension that is acting upon the second lever, holds the first lever in its release position. In this way, the locking means between the upper rail and the lower rail remain released in the entire easy-entry-longitudinal adjustment range. When the vehicle seat is shifted back out of the easy-entry-longitudinal adjustment range into the comfort-longitudinal adjustment range, the second lever arm of the second lever butts against an abutment that is secured to the lower rail, as a result of which the second lever pivots against the pre-tension and again releases the first lever, so that the locking is again established between upper rail and lower rail. The drawback of this known vehicle seat is that the means for preserving the release in the easy-entry-longitudinal adjustment range have a relatively complicated construction.

It is an object of the present invention to provide a motor vehicle seat of the aforementioned general type with which the lower rail can be provided with arresting notches over its entire length, and with which when the easy-entry-longitudinal adjustment ranges are particularly great, damage to the locking means when the motor vehicle seat is pushed back out of its easy-entry-longitudinal adjustment range into its comfort-longitudinal adjustment range is avoided with straightforward means.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
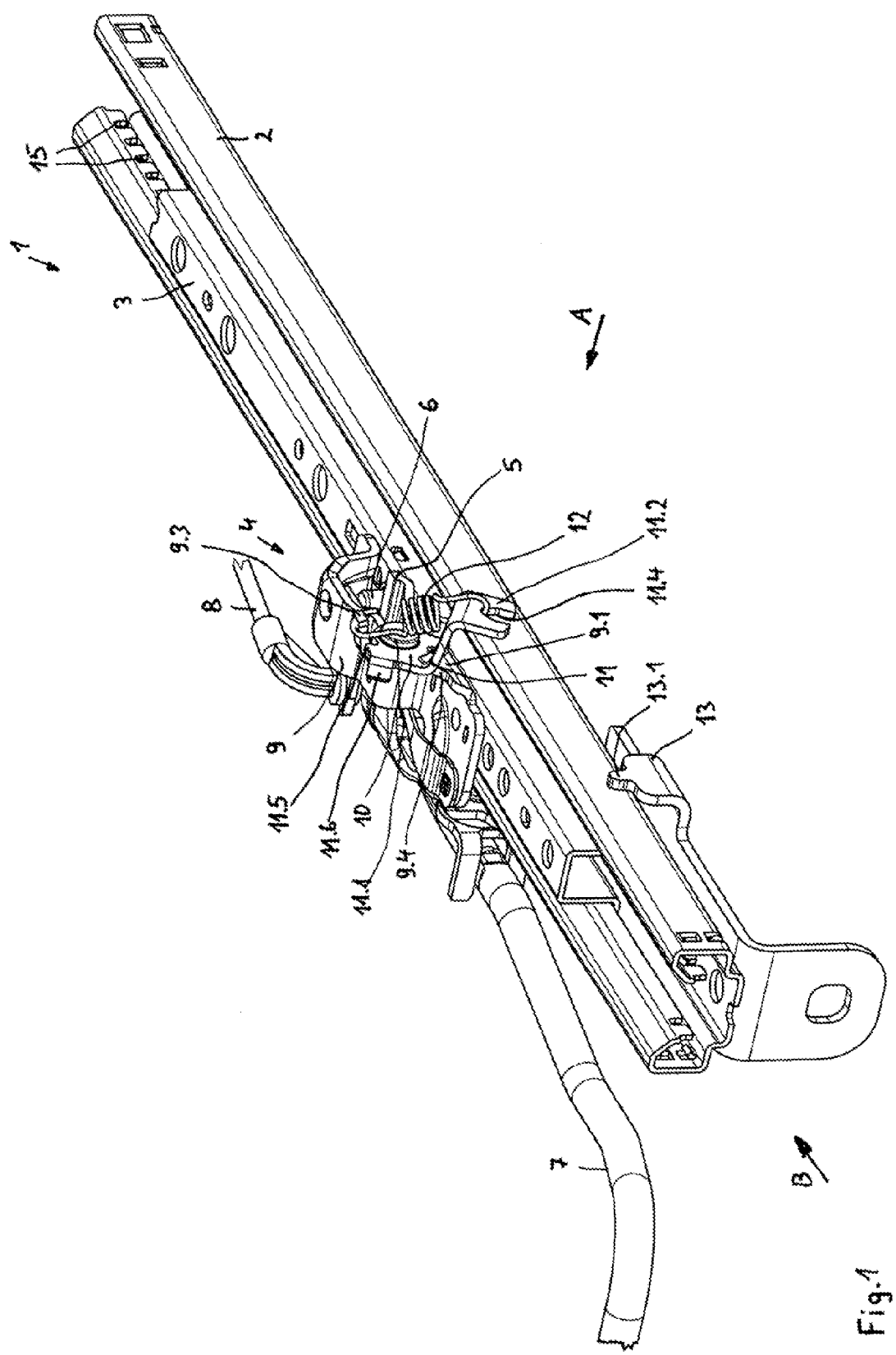
FIG. 1 is a perspective view at an angle from the front and above onto a rail pair that serves for the longitudinal adjustment of an otherwise not illustrated motor vehicle seat, and is shown in the comfort-longitudinal adjustment range.
Figure 2:
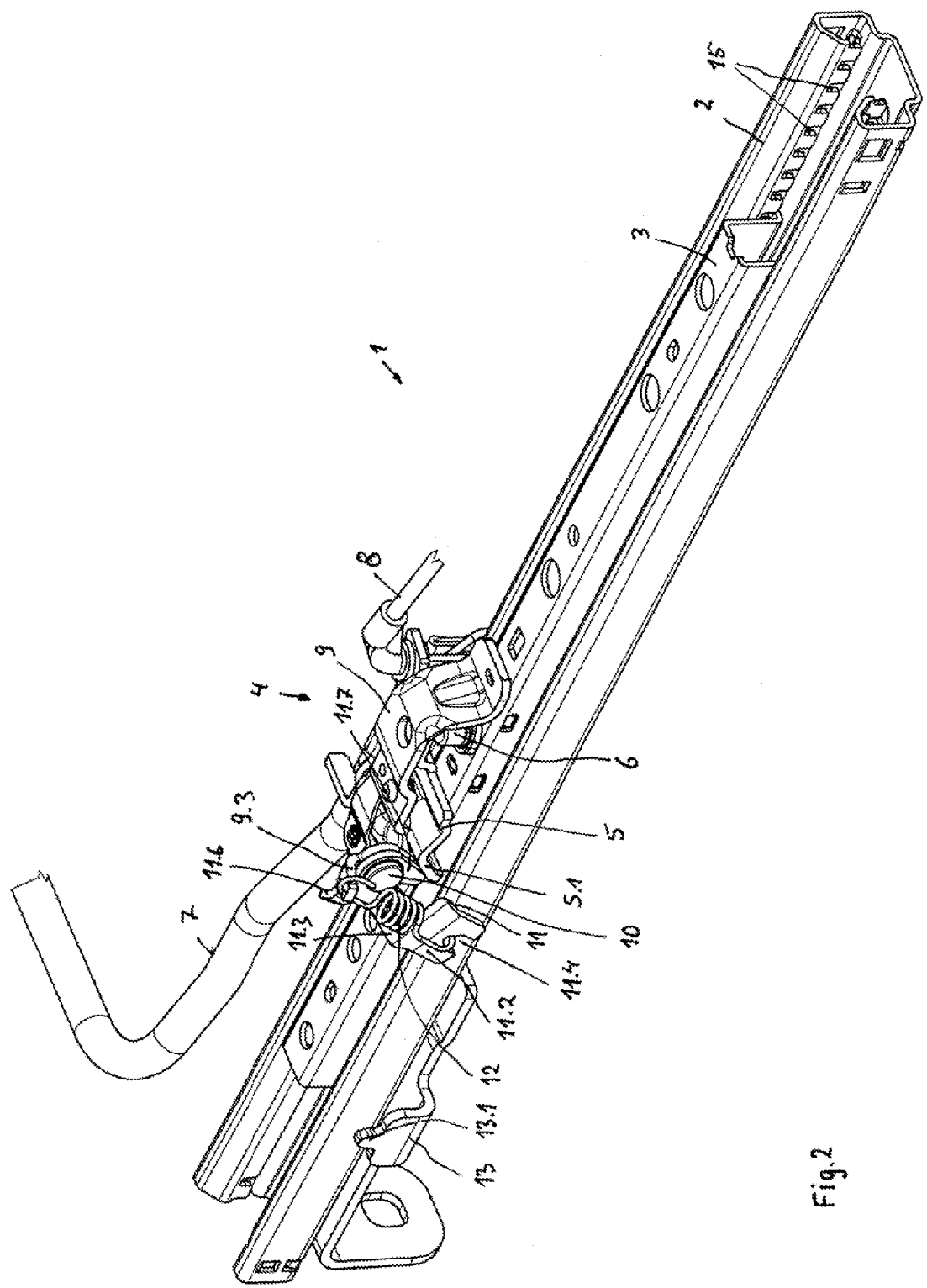
FIG. 2 is a perspective view at an angle from above and the rear onto the rail pair of FIG. 1.

The object of the present application is realized with a manually, longitudinally adjustable motor vehicle seat that comprises: a respective rail pair for disposition on opposite sides of a motor vehicle seat, wherein each of the rail pairs is comprised of a lower rail, which is configured for securement to a chassis of the vehicle, and an upper rail, which is longitudinally displaceable in the lower rail and is configured for securement to a component of the motor vehicle seat; locking mechanisms for securing the upper rails in position on the lower rails; release mechanisms for releasing the locking mechanisms, wherein the motor vehicle seat has a comfort-longitudinal adjustment range and an easy-entry-longitudinal adjustment range, and wherein the release mechanisms are operatively connected to a backrest of the motor vehicle seat, which backrest is configured to be folded forward into an easy-entry-position, in such a way that upon a forward folding of the backrest, the release mechanisms assume a release position in which the locking mechanisms are released, further wherein each of the release mechanisms comprises:

a pivot shaft that is secured to the upper rail;
 a blocking lever pivotably mounted on the pivot shaft;
 a spring device for acting upon the blocking lever such that the blocking lever can assume two stable extreme pivot positions, which are respectively limited by stop mechanisms, namely a passive position in which the blocking lever has no contact with the release mechanism, and an active position in which the blocking lever blocks the release mechanism in the release position achieved by the release mechanism when the backrest is folded forward; and
 a control device secured to the lower rail, wherein upon longitudinal displacement of the motor vehicle seat out of the comfort-longitudinal adjustment range into the easy-entry-longitudinal adjustment range, the control device is configured to come into contact with the blocking lever and pivot it, against the force of the spring device, out of its passive position and into its active position, and vice versa.

As a consequence of the folding forward of the backrest of an inventive motor vehicle seat into its easy-entry-position, the locking between the lower rails and the upper rails is released by an appropriate actuation of the release mechanisms. The motor vehicle seat can now be shifted toward the front with the backrest folded forward. The blocking lever travels this path together with the upper rail and eventually comes into contact with the control device that is secured to the lower rail. As a result, the blocking lever is pivoted out of its passive position and into its active position. In this position, the blocking lever acts upon the release mechanism, so that the latter is blocked in its release position in the entire easy-entry-longitudinal adjustment range. If, in the easy-entry-longitudinal adjustment range, the backrest is now folded back into its position of use, the upper rails would thereby again be locked on the lower rails. However, this is prevented by the blocking lever, which continues to hold the release mechanism in its release position. For this reason, with a motor vehicle seat that is configured in the inventive manner, the lower rail is provided with arresting notches over its entire length.

When the motor vehicle seat is pushed back out of its easy-entry-longitudinal adjustment range into its comfort-longitudinal adjustment range, the blocking lever again comes into contact with the control device, so that it pivots out of its active position into its passive position. As a consequence, the release mechanism is released, so that the upper rails can again be locked with the lower rails in the comfort-longitudinal-adjustment range. With particularly long easy-entry-longitudinal adjustment ranges, where the locking mechanisms are moved entirely out of the lower rails, the inventive configuration also prevents movement of the locking mechanisms against the lower rails when the motor vehicle seat is returned to its comfort-longitudinal adjustment range, which would result in damage to the locking mechanisms.

Pursuant to further advantageous specific embodiments of the present invention, the blocking lever can be acted upon by a tension spring, one end of which is suspended at a location secured to the upper rail, and the other end of which is suspended in the blocking lever, whereby the pivot shaft of the blocking lever is disposed between these two suspension locations, and an imaginary connecting line can extend between the suspension locations on both sides of the pivot shaft. The release mechanism can be in the form of a release lever that in its release position is blocked by an arresting nose of the blocking lever when the latter is in its active position. That end of the release lever that faces the arresting nose can be embodied as an inclined run-up surface for the arresting nose.

The blocking lever, on its end that is remote from the pivot shaft, can be provided with a downwardly open recess into which, when the motor vehicle seat is shifted forward into its easy-entry-longitudinal adjustment range, a nose of a control cam that is secured to the lower rail can engage, so that if the motor vehicle seat is shifted further toward the front, the locking lever pivots into its active position. The control cam can be fixed in position on the lower rail in various longitudinal positions.

Further specific features of the present invention will be described in detail subsequently.

DESCRIPTION OF SPECIFIC EMBODIMENTS

Figure 10:
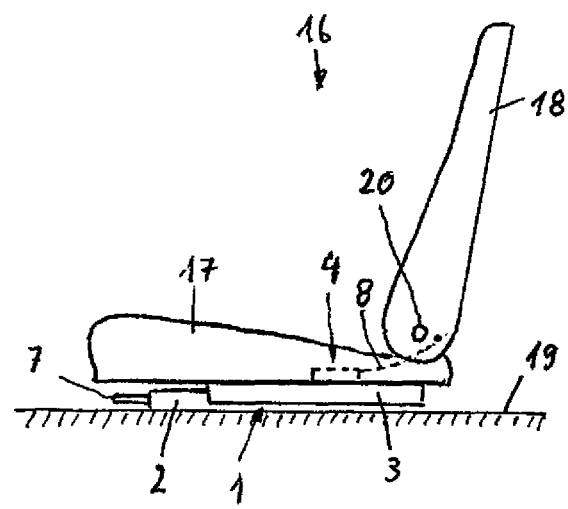
FIG. 10 is a diagrammatic side view of a vehicle seat provided with slides of the invention.

FIG. 10 shows a vehicle seat 16 with a seating portion 17 and a backrest 18. The backrest 18 is mounted on the seating portion 17 to tilt about a horizontal transverse axis 20. The seating portion 17 is mounted on the chassis 19 of the vehicle by means of two rail pairs 1 (only one of which can be seen in FIG. 10).

The drawings illustrate further one of the two rail pairs 1 of the motor vehicle seat equipped with a comfort-longitudinal adjustment and an easy-entry-longitudinal adjustment. The two rail pairs 1 have an identical configuration, so that the following discussion also applies for the non-illustrated rail pair 1.

The rail pair 1 is comprised of a lower rail 2, which is fixedly connected with a chassis 18 of a vehicle, and an upper rail 3, which is fixedly connected with the seat portion 17 of the motor vehicle seat 16. The upper rail 3 is longitudinally displaceably mounted in the lower rail 2.

Figure 3:
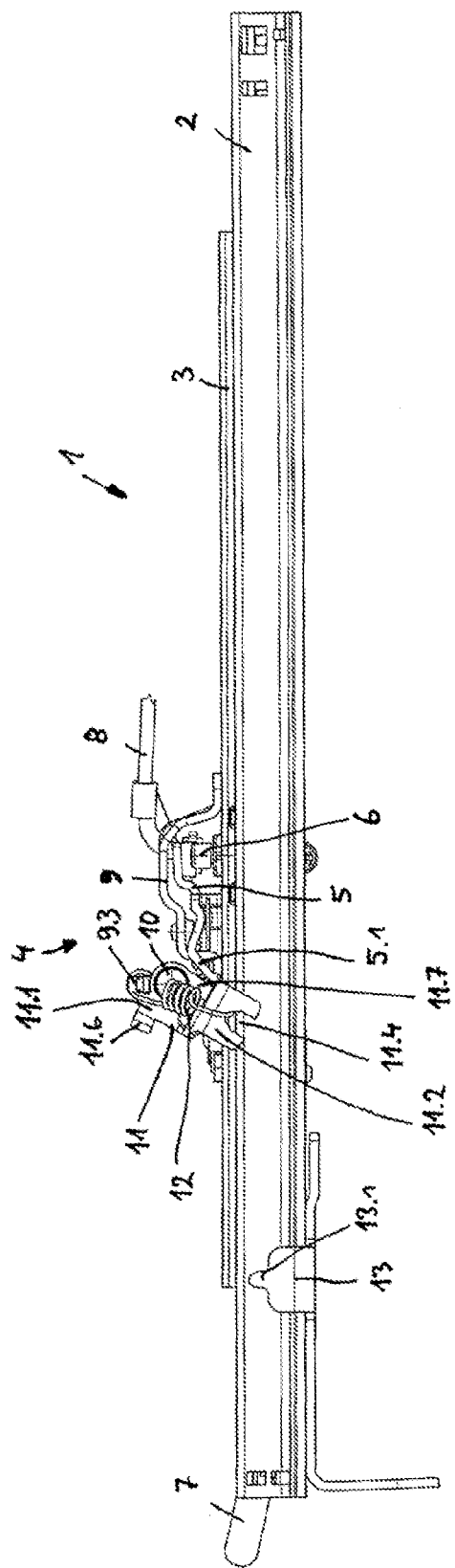
FIG. 3 is a view taken in the direction of the arrow A (FIG. 1) onto the rail pair of FIGS. 1 and 2.
Figure 4:
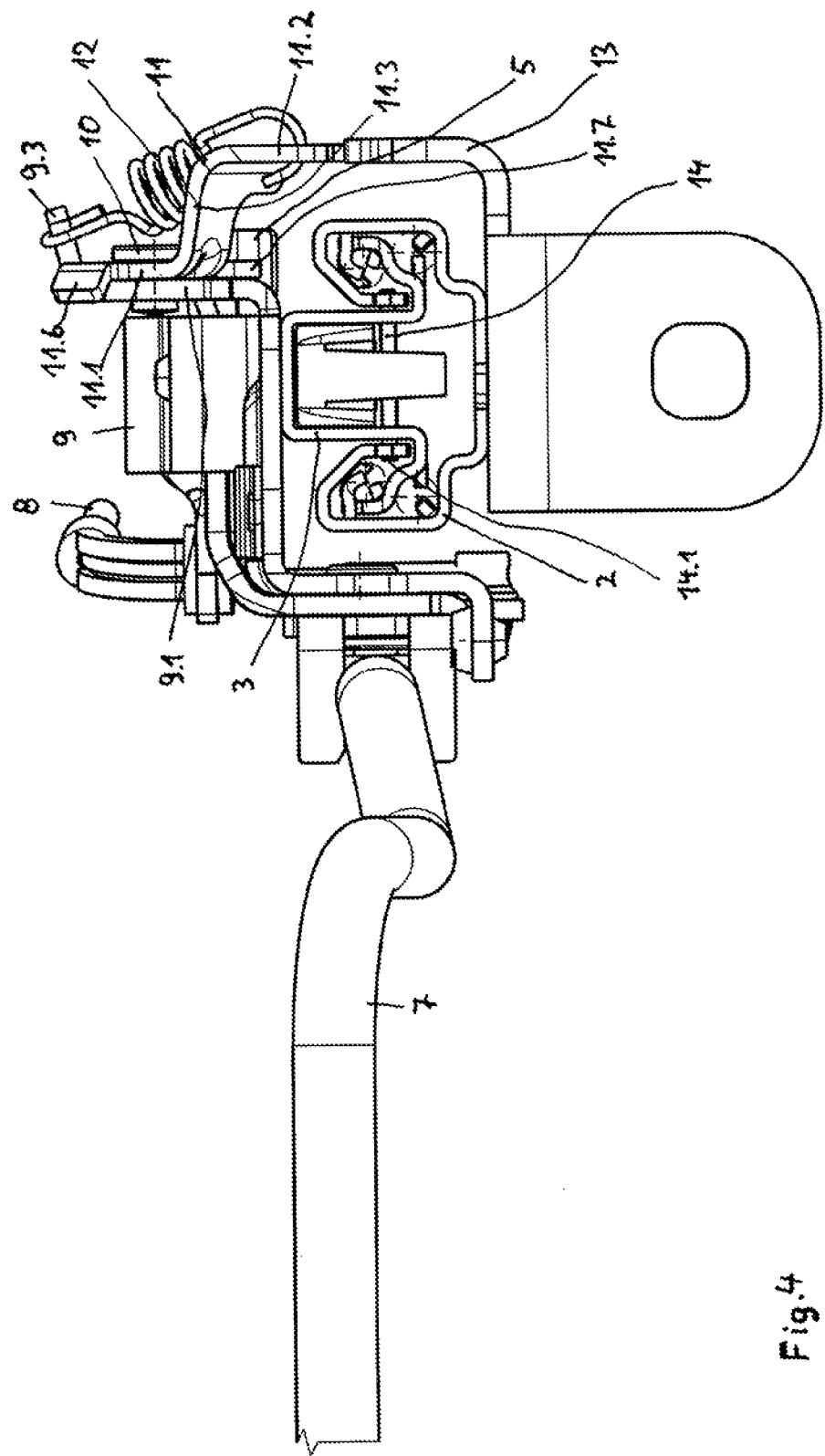
FIG. 4 is a view taken in the direction of the arrow B (FIG. 1) onto the rail pair of FIG. 1.

The rail pair 1 is provided with a release mechanism 4 for the comfort-release and easy-entry-release of the upper rail 3 from the lower rail 2. This release mechanism 4 is provided with a release lever 5 that extends above the push member 6 (see in particular FIG. 3), which is biased against the release lever 5. The push member 6, together with a locking plate 14 (see FIGS. 4 and 8), are part of a locking mechanism. On its sides that are horizontal relative to the rails 2 and 3, the locking plate 14 is provided with a plurality of arresting teeth 14.1, which in the locking state engage in a corresponding number of arresting notches 15 that are provided on both sides in the lower rail 2 and are spaced equidistantly from one another. The locking plate 14 is biased in the locking direction. The distance between the arresting notches 15 determines the smallest possible adjustment path or displacement.

In order to release the upper rail 3 from the lower rail 2, the push member 6 must be pressed downwardly by means of the release lever 5, as illustrated in FIGS. 5-7 and 9. For this purpose, the release lever 5 is operatively connected with an actuation or control handle or member 7, and a Bowden cable 8. The control member 7 serves for the comfort-release and the Bowden cable 8 serves for the easy-entry-release. For the comfort-release, the control member 7 is pulled upwardly. This pivot movement is transferred to the release lever 5, which pivots downwardly and hence presses the push member 6 downwardly. The locking plate 14 is thereby also displaced downwardly, so that the arresting teeth 14.1 drop downwardly out of the arresting notches 15 of the lower rail 2. The upper rail 3 is now released from the lower rail 2, so that with the control handle or member being held, the motor vehicle seat can be adjusted to the desired longitudinal position in the comfort-longitudinal adjustment range. When this is achieved, the control member 7 is released, so that the push member 6 can again assume its locking position, and the arresting teeth 14.1, in the set longitudinal position, can enter into the corresponding, oppositely disposed arresting notches 15 of the lower rail 2. The motor vehicle seat is then locked into its new longitudinal position.

The easy-entry-release of the longitudinal adjustment of the motor vehicle seat is initiated by folding the backrest 18 toward the front into its easy-entry-position. This folding movement is transferred via the Bowden cable 8 that is connected with the backrest 18 to the release lever 5, which as a result, as with the above-described comfort-release, again pivots downwardly and thus presses the push member 6 as well as the locking plate 14 downwardly for the release of the upper rail 3 from the lower rail 2. The motor vehicle seat can now, with the backrest 18 folded forwardly, be displaced toward the front out of its comfort-longitudinal adjustment range into its easy-entry-longitudinal adjustment range or region.

The remaining components of the release mechanism 4 visible in the drawing are not important for understanding the present invention, and will therefore not be explained.

Disposed on the upper side of the upper rail 3 is a bridge-like mounting plate 9 that is connected to the upper rail 3 by means of welding or a screw connection. Extending upwardly from the mounting plate 9 on the outer side of the rail pair 1 is a mounting flange 9.1 that is monolithically formed with the mounting plate 9. A pivot shaft 10 is disposed on the mounting flange 9.1. Pivotably seated on the pivot shaft 10 is a blocking lever 11, which comprises two end portions 11.1 and 11.2 that are disposed essentially parallel to one another and are interconnected by a cross member 11.3, from which they project in opposite directions (see for example FIG. 8). The blocking lever 11 has a monolithic configuration. Its end portion 11.1 receives the pivot shaft 10, while one end of a tension spring 12 is mounted in its end portion 11.2, which is bent off outwardly by the cross member 11.3. For this purpose, a recess 11.4 that is outwardly open is provided in the end portion 11.2. The other end of the tension spring 12 is mounted in a nose 9.3 that is part of the mounting flange 9.1 of the mounting plate 9.

The pivot shaft 10 is disposed between the mounting locations of the tension spring 12 in the nose 9.3 and the end portion 11.2. The tension spring 12 therefore has the tendency to pivot the blocking lever 11 in one or the other direction depending upon on which side of the pivot shaft 10 an imaginary connecting line between the mounting locations of the tension spring 12 extends. To limit these pivot movements, the blocking lever 11 has a first abutment 11.5, which to limit the pivot movement of the blocking lever 11 in the one direction abuts against the nose 9.3 of the mounting plate 9, and a second abutment 11.6, which to limit the pivot movement of the blocking lever 11 in the other direction abuts against an inclined surface 9.4 of the mounting flange 9.1 of the mounting plate 9.

An arresting nose 11.7 (see for example FIG. 9) is part of the end portion 11.1 of the blocking lever 11, and cooperates with the release lever 5 in a manner to be described subsequently.

Due to the effect of the tension spring 12 in conjunction with the abutments 11.5 and 11.6, the blocking lever 11 can assume two stable states, namely a passive position, in which the arresting nose 11.7 of the blocking lever 11 has no contact with the release lever 5, which is the case in the comfort-longitudinal adjustment range, and an active position, in which the arresting nose 11.7 blocks the release lever 5 in its release position, which is the case in the easy-entry-longitudinal adjustment range. In the pivot positions disposed therebetween, the blocking lever 11 is not stable, i.e., it will always assume either the active position or the passive position depending upon on which side of the pivot shaft 10 an imaginary connecting line extends linearly between the mounting locations of the tension spring 12.

The shifting of the blocking lever 11 out of the passive position into the active position, and vice versa, will be explained in detail subsequently.

Figure 5:
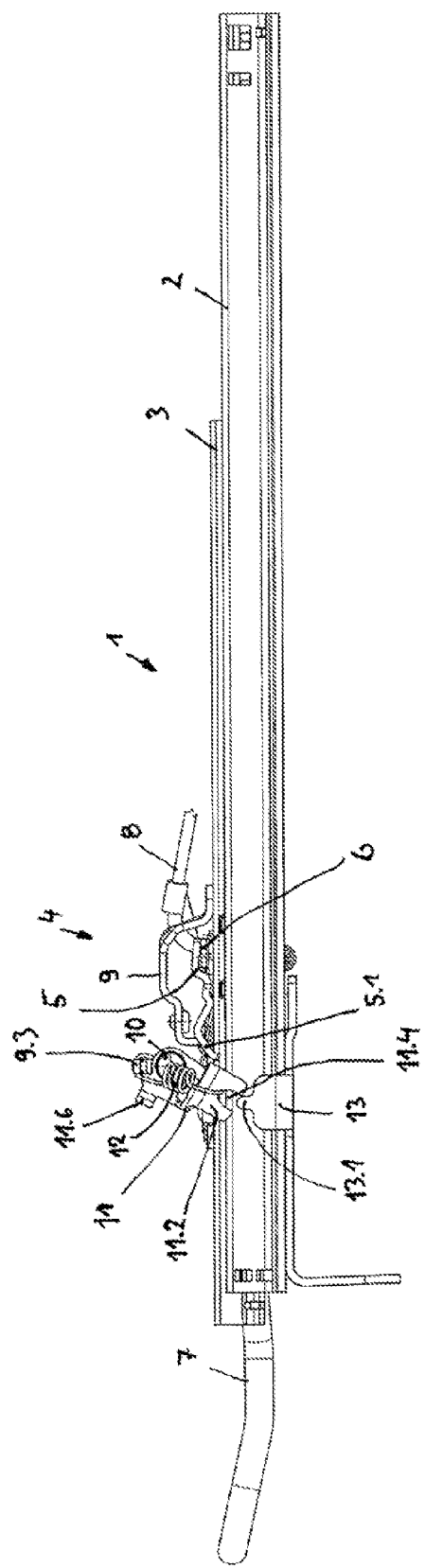
FIG. 5-7 show the rail pair of FIG. 3 during the transition of the rail pair from the comfort-longitudinal adjustment range into the easy-entry-longitudinal adjustment range.
Figure 6:
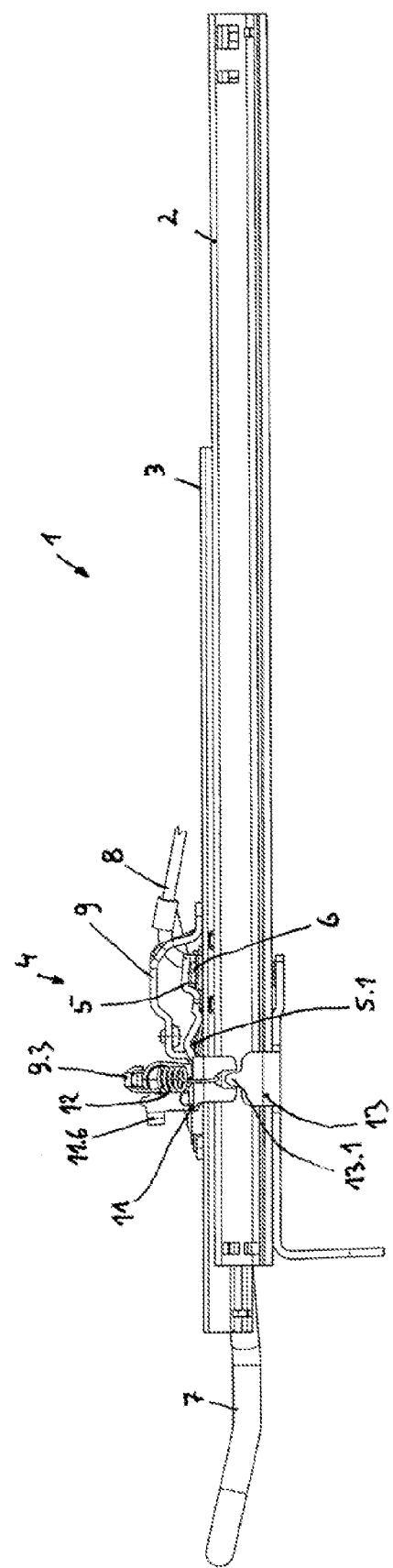
Figure 7:
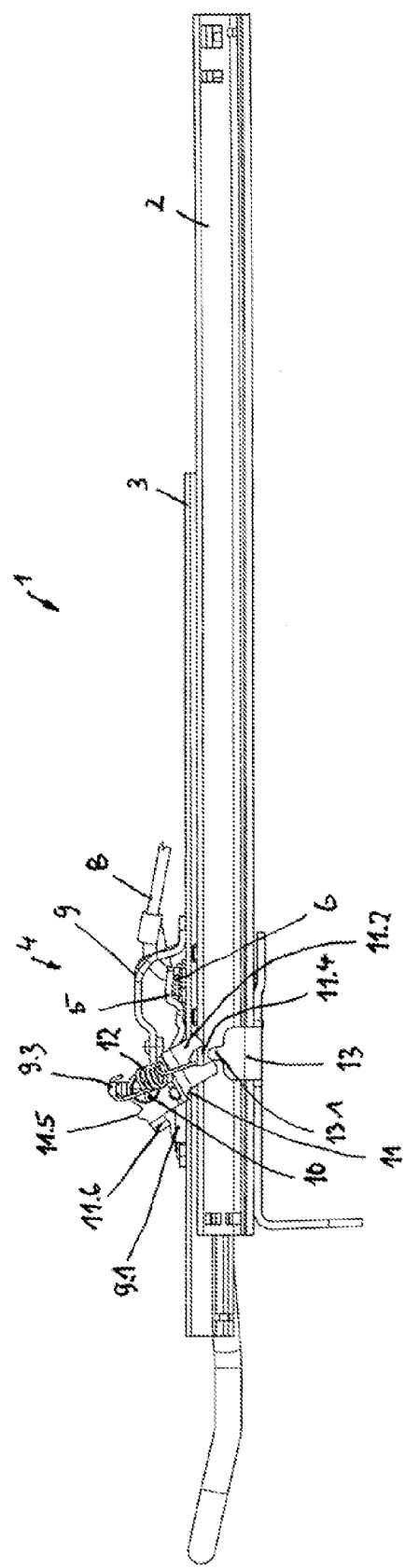
Figure 8:
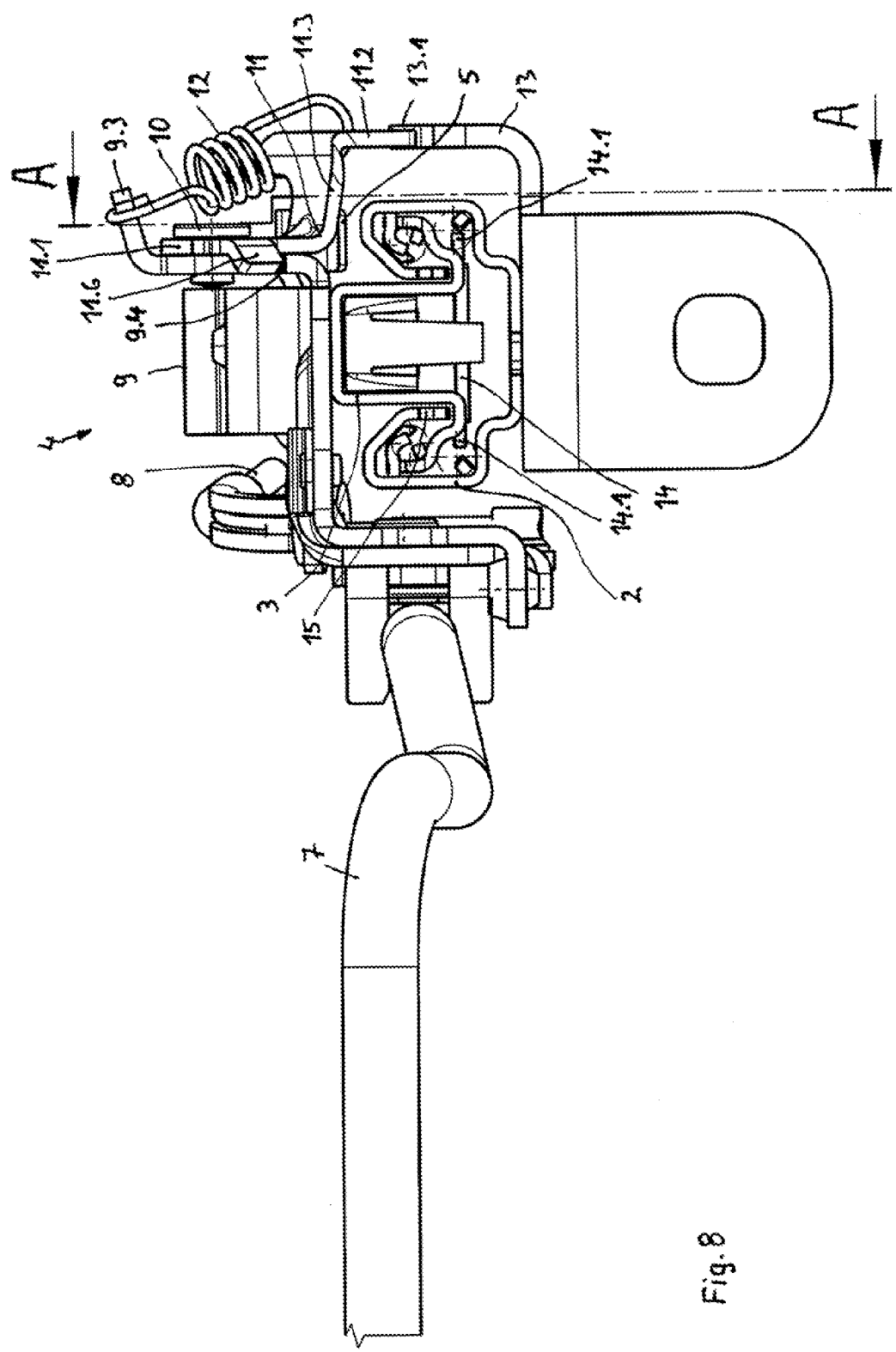
FIG. 8 is an illustration of the rail pair of FIG. 4 when the latter is in the easy-entry-longitudinal adjustment range.
Figure 9:
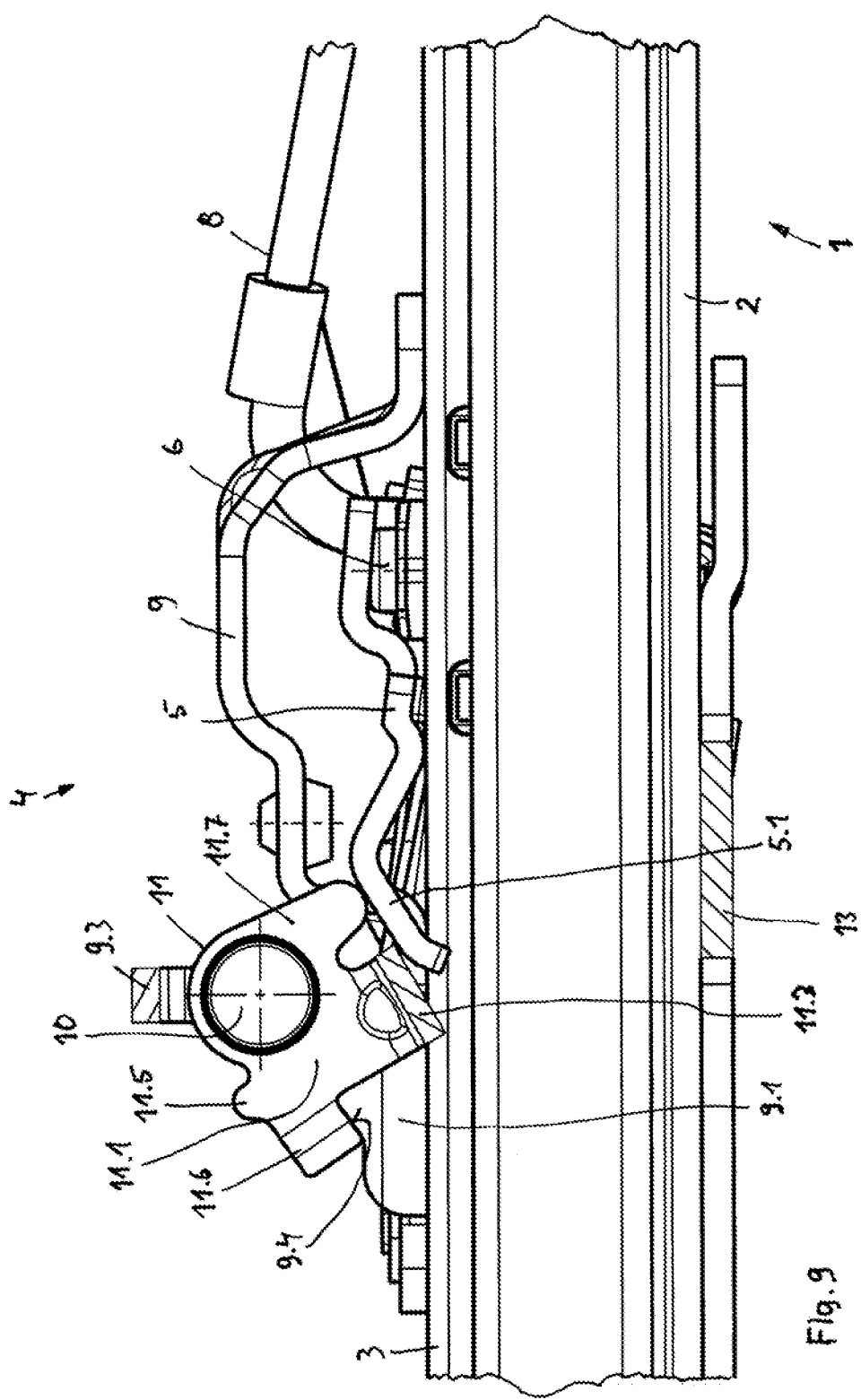
FIG. 9 is a view taken along the line A-A in FIG. 8.

The starting point is the situation illustrated in FIGS. 1-4. In this situation, the motor vehicle seat 16 is in its comfort-longitudinal adjustment range. The upper rail 3 is locked onto the lower rail 2, and the blocking lever 11 is in its passive position, in which its abutment 11.5 rests against the nose 9.3 of the mounting plate 9, and the arresting nose 11.7 has no contact with the release lever 5. If the motor vehicle seat 16 is now to be shifted out of its comfort-longitudinal adjustment range and into its easy-entry-longitudinal adjustment range, first the backrest 18 has to be folded toward the front. This actuates the Bowden cable 8, by means of the effect of which the release lever 5 is pivoted downwardly, and the push member 6 is thus pressed downwardly for the release of the upper rail 3 from the lower rail 2. With the backrest 18 folded toward the front, the motor vehicle seat 16 can now be further shifted toward the front. Along this displacement path the blocking lever 11 comes into contact with a control cam 13 that is secured to the lower rail 2. This situation is shown in FIG. 5. In view of this contact, a nose 13.1 of the control cam 13 enters the recess 11.4 of the blocking lever 11, so that when the motor vehicle seat 16 is pushed further toward the front, the blocking lever 11 pivots against the force of the tension spring 12 into its active position, as illustrated in FIGS. 7 to 9. FIG. 6 shows a neutral position of the blocking lever 11 between its passive position and its active position.

In the active position of the blocking lever 11, its arresting nose 11.7 rests upon the release lever 5, so that the latter is blocked in its release position. The active position of the blocking lever 11 is determined by abutment of its abutment 11.6 against the inclined surface 9.5 of the mounting plate 9. This situation can be best seen in FIG. 9.

On its end that faces the arresting nose 11.7 of the blocking lever 11, the release lever 5 has an inclined run-up surface 5.1. During the pivoting movement of the blocking lever out of its passive position into its active position, the arresting nose 11.7 runs up on this inclined run-up surface 5.1, so that in addition to the blocking effect, if the release is possibly not complete, the release lever 5 is pressed further downwardly for the complete release.

Due to the inventive solution, the upper rail 3 also remains released from the lower rail 2 in the easy-entry-longitudinal adjustment range if the backrest 18 is folded back into its position of use, since the release lever 5 continues to be held in its release position by the blocking lever 11. As a consequence, noises or damage of the locking mechanism due to the shifting back of the motor vehicle seat 16 are avoided.

A further advantage of the inventive solution is that it is no longer necessary to eliminate the arresting notches 15 in the lower rail 2 in the easy-entry-longitudinal adjustment range. Therefore, the lower rails 2 can be provided throughout with the arresting notches 15, regardless of how long the comfort-longitudinal adjustment range is and how long the easy-entry-longitudinal adjustment range is; this is not illustrated in the drawings. Consequently, it is no longer necessary to produce different designs of lower rails 2 having ranges of arresting notches 15 of different lengths.

The specification incorporates by reference the disclosure of German priority document 10 2010 051 336.9 filed Nov. 13, 2010.

The present invention is, of course, in no way restricted to the specific disclosure of the specification and drawings, but also encompasses any modifications within the scope of the appended claims.

What I claim is:

1. A manually, longitudinally adjustable motor vehicle seat, comprising:
    a respective rail pair for disposition on opposite sides of a motor vehicle seat, wherein each of said rail pairs is comprised of a lower rail, which is configured for securement to a vehicle chassis, and an upper rail, which is longitudinally displaceable in said lower rail and is configured for securement to a component of the motor vehicle seat;
    locking mechanisms for securing said upper rails in position on said lower rails, comprising a push member and a locking plate;
    release mechanisms for releasing said locking mechanisms, wherein the motor vehicle seat has a comfort-longitudinal adjustment range and an easy-entry-longitudinal adjustment range, and wherein said release mechanisms are operatively connected to a backrest of a motor vehicle seat via a cable, wherein said backrest is configured to be folded forward into an easy-entry-position, in such a way that the folding movement is transferred via the cable to the release mechanisms that are released, further wherein each of said release mechanisms comprises:
    a release lever that extends above said push member, wherein said push member is biased against the release lever;
    a pivot shaft secured to said upper rail;
    a blocking lever pivotably mounted on said pivot shaft;
    a spring device for acting upon said blocking lever, wherein due to said spring device said blocking lever is adapted to assume two stable extreme pivot positions, namely a passive position in which said blocking lever has no contact with said release lever, and an active position in which said blocking lever blocks said release lever in said release position achieved by said release mechanism when the backrest is folded forward;
    stop mechanisms for respectively providing limits for said extreme pivot positions of said blocking lever, comprising a first abutment of the blocking lever and a second abutment of the blocking lever; and
    a control cam secured to said lower rail, wherein upon longitudinal displacement of the motor vehicle seat out of the comfort-longitudinal adjustment range into the easy-entry-longitudinal adjustment range, said control cam comes into contact with said blocking lever and due to the longitudinal displacement, pivots said blocking lever, against the force of said spring device, out of its passive position and into its active position, and vice versa,
    wherein said blocking lever is provided with a downwardly open recess at an end that is remote from said pivot shaft, further wherein said control cam is secured to said lower rail, further wherein said control cam is provided with a nose, and wherein when said motor vehicle seat is shifted forwardly into its easy-entry-longitudinal adjustment range, said nose engages into said recess of said blocking lever, so that upon a further forward displacement of the motor vehicle seat, said blocking lever pivots into its active position.

2. A manually, longitudinally adjustable seat according to claim 1, wherein said spring device is a tension spring, further wherein one end of said tension spring is suspended at a location that is secured to said upper rail, further wherein another end of said tension spring is suspended at a location of said blocking lever, further wherein said pivot shaft is disposed between said suspension locations, and wherein an imaginary connecting line can extend between said suspension locations on opposite sides of said pivot shaft.

3. A manually, longitudinally adjustable seat according to claim 1, wherein said blocking lever is provided with an arresting nose, further wherein said release mechanism includes a release lever, and wherein said release lever is blocked in a release position by said arresting nose when said blocking lever is in its active position.

4. A manually, longitudinally adjustable seat according to claim 3, wherein an end of said release lever that faces said arresting nose is embodied as an inclined run-up surface for said arresting nose.

* * * * *